United States Patent [19]

Porod

[11] 4,027,054
[45] May 31, 1977

[54] APERTURED BELT CONVEYING

[75] Inventor: Robert F. Porod, Cicero, Ill.

[73] Assignee: Western Electric Company, Inc., New York, N.Y.

[22] Filed: Oct. 20, 1975

[21] Appl. No.: 624,138

[52] U.S. Cl. .................................. 427/79; 427/80; 427/282; 427/422; 427/424; 427/427; 198/654

[51] Int. Cl.² ...................... B05D 1/02; B05D 5/12

[58] Field of Search ............. 427/79, 282, 80, 422, 427/424, 427; 118/301; 198/179; 228/212, 213

[56] References Cited

UNITED STATES PATENTS

| 2,988,199 | 6/1961 | Pinkham | 198/179 |
|---|---|---|---|
| 3,635,730 | 1/1972 | Sweitzer | 427/282 |
| 3,649,507 | 3/1972 | Welter | 198/179 |
| 3,667,989 | 6/1972 | Keating | 427/282 |
| 3,713,876 | 1/1973 | Lauric | 427/123 |
| 3,809,011 | 5/1974 | Fabre | 118/301 |
| 3,817,782 | 6/1974 | Klein | 427/79 |

Primary Examiner—Michael F. Esposito
Attorney, Agent, or Firm—W. G. Dosse; R. P. Miller

[57] ABSTRACT

A flexible belt carrier is provided for use in an apparatus for spray soldering the ends of roll capacitor blanks. The belt may be constructed of silicon rubber and has apertures extending transversely through the belt which are positioned very near to one of its surfaces. A slit or opening is made at each aperture through the web separating the aperture from the nearest surface of the belt. The belt moves in a sinuous path such that when flexed around a pulley in one direction the edges of the slit spread and gap, allowing ready insertion of a blank. When the belt passes over another pulley, the belt flexes in the opposite direction so as to foreshorten the slit surface. The slits are made at an angle acute to the surface of the belt. Therefore, as their surface foreshortens, the walls of the web formed at the slit cam against one another and overlap, thereby fully and tightly encircling the capacitor blank, exposing only the ends thereof. At this point, molten solder is sprayed at the sides of the belt and makes contact with the ends of the capacitor blank, adhering thereto. The belt then passes around another pulley which causes the slit edges again to gap, freeing the capacitor blank which is then ejected from the belt. The flexing of the belt loosens any surplus solder that may adhere to the belt.

4 Claims, 8 Drawing Figures

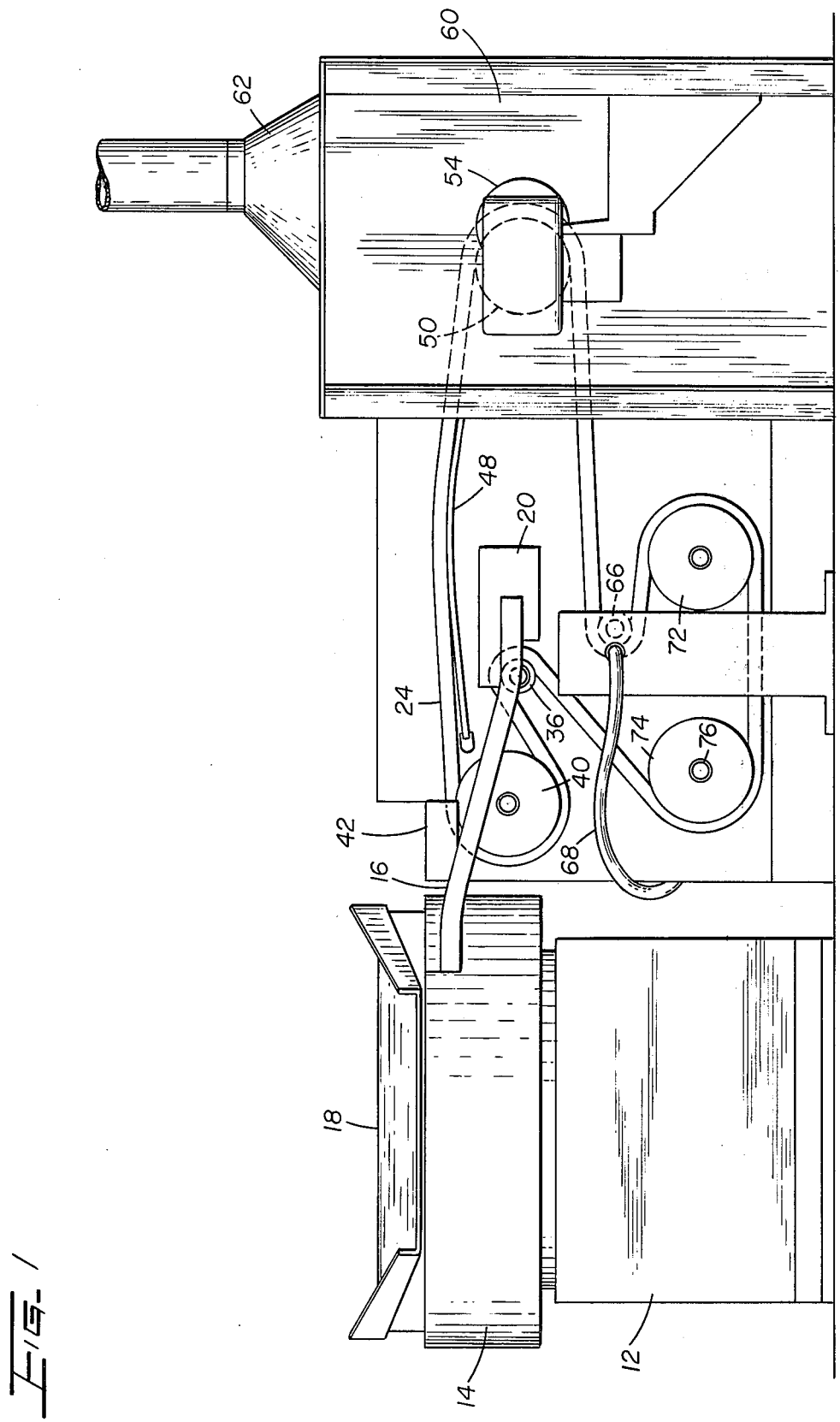

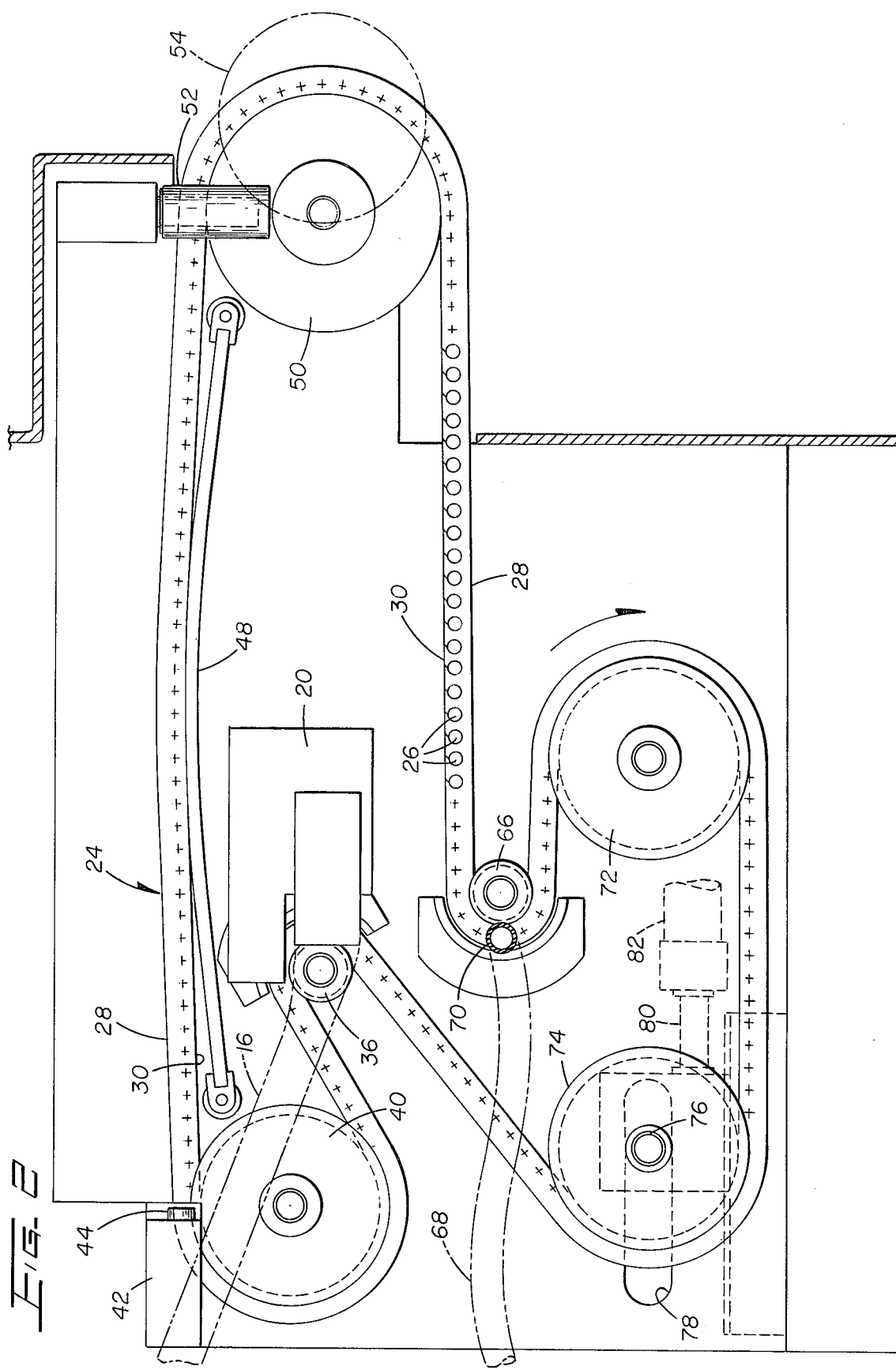

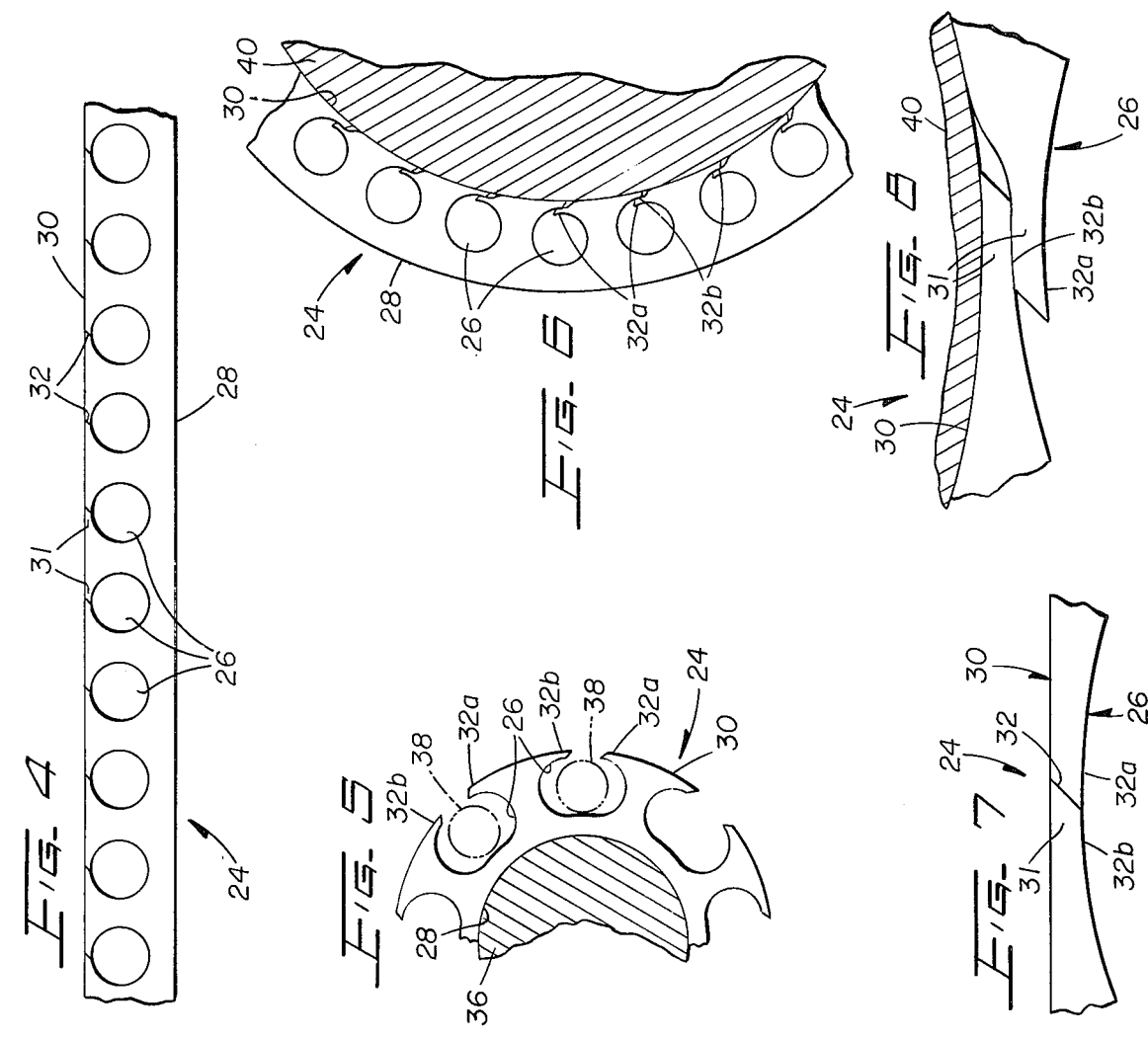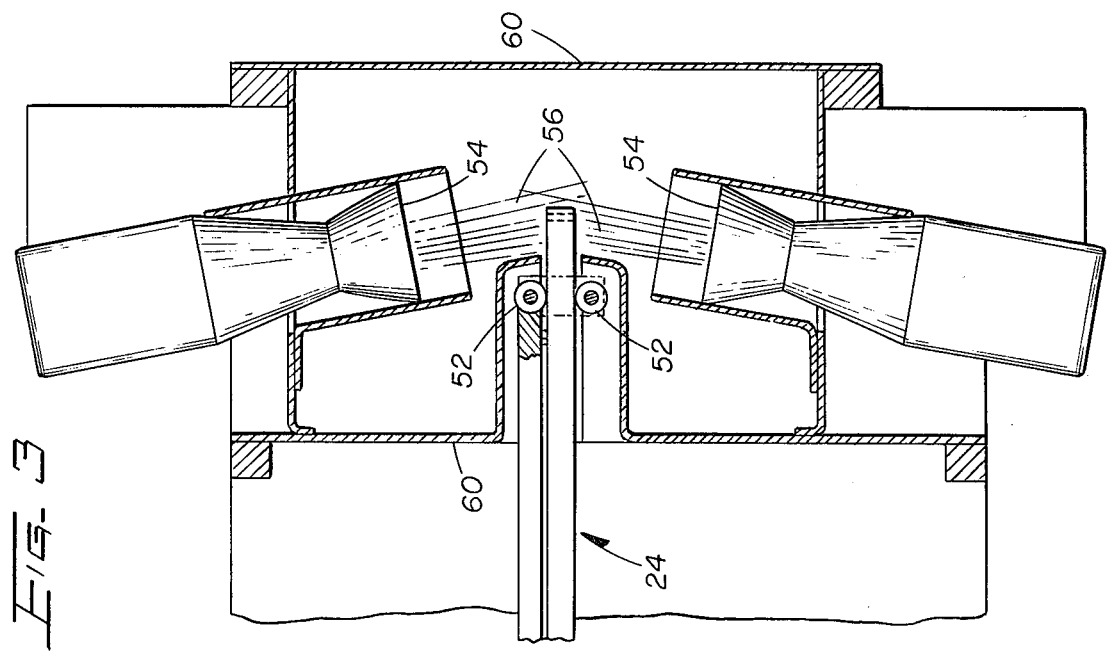

APERTURED BELT CONVEYING

BACKGROUND OF THE INVENTION

1. Field of the Invention

This invention relates to conveying and more specifically to conveying using a flexible carrier having apertures transversely therethrough and openable along one surface.

2. Description of the Prior Art

In the manufacture of roll capacitors, the ends of the roll capacitor are covered with solder. In the end-soldering operation, as practiced in the prior art, the capacitor blanks are mounted in a multiple-capacitor nesting plate which is then masked to prevent solder from bridging from end-to-end of the capacitors. Molten solder is then sprayed in a raster-like, two-dimensional pattern across each mask so as to coat both ends of the roll capacitor blanks with solder to comprise the terminals thereof. This fixture is loaded manually, and surplus solder must be manually cleaned from the masks.

Flexible conveyor or carrier belts are known (U.S. Pat. No. 2,988,199, Pinkham issued June 13, 1961; British Pat. No. 753,518, Phillips issued July 25, 1956; and French Pat. No. 1,094,914, Philips issued May 25, 1955), in which a flexible belt is provided with transverse apertures and substantial openings extending from each aperture to one surface of the belt. These belts are used for gripping items as diverse as cigarettes and machine workpieces. However, these belts are no more than conveying clamps for holding the workpieces along arcuate surfaces and carrying them along, with no thought being given to surrounding or masking a workpiece for possible spray soldering.

SUMMARY OF THE INVENTION

In accordance with one aspect of the present invention, an endless belt of flexible material has apertures transversely across its width which apertures are positioned significantly closer to one surface of the belt than the other. An opening or slit is provided between the aperture and the nearest surface of the belt, said slit being at an angle acute to the surface of the belt.

In accordance with another aspect of the present invention, a machine is provided for carrying an article from a loading station to a work station, completely surrounding that portion of the article that is not to be worked and leaving exposed only that portion on which a work operation is to be performed, and subsequently releasing the article.

BRIEF DESCRIPTION OF THE DRAWINGS

A more complete understanding of the present invention may be had by referring to the following detailed description when considered in conjunction with the accompanying drawings wherein like reference numbers refer to the same or similar parts throughout the several views:

FIG. 1 is an elevation view of a solder spraying apparatus in combination with a conveying mechanism;

FIG. 2 is a more detailed view of the conveyor mechanism of the apparatus of FIG. 1 embodying features of the present invention;

FIG. 3 is a plan view of a solder spraying station of the apparatus of FIG. 1;

FIG. 4 is a detail, fragmentary view of the conveyor belt in its neutral or straight condition;

FIG. 5 is a view of the belt of FIG. 4 shown curved around a pulley;

FIG. 6 is a view of the belt of FIG. 4 but curved around a pulley in the opposite direction;

FIG. 7 is a greatly enlarged detail of a portion of the belt as shown in FIG. 4; and FIG. 8 is a greatly enlarged detail of the same portion of the belt illustrated in FIG. 7 but as curved around a pulley as illustrated in FIG. 6.

DETAILED DESCRIPTION

Referring now to the above-mentioned drawings and more particularly to FIG. 1, there is shown a pedestal 12 surmounted by a vibratory-bowl feeder 14 of conventional design which delivers capacitor blanks, in the shape of tightly rolled cylinders of dielectric and conductive material, along a chute 16 to a conveyor-belt loading station 20. The loading station 20 may, for example, be of the type shown in the above-mentioned prior art patents. The capacitors may also be of the flat variety.

Referring now to FIGS. 4 and 7, a section of the conveyor belt 24 is shown having a plurality of apertures extending transversely from one side surface, in the plane of the drawing of FIG. 4, to another, opposed side surface parallel thereto. The apertures extend fully through the belt in a direction generally parallel with the lower surface 28 and the upper surface 30. The apertures 26 are not centered in the thickness of the belt between the surfaces 28 and 30 but are positioned very close to the top surface 30. Therefore, a very thin web 31 of belt material exists between the aperture and the surface 30.

This very thin web of belt material is cut straight across the entire width of the belt to form a slit or opening 32, and the slit or opening 32 makes an acute angle (less than) 90° with the upper surface 30 of the belt to form two flaps 32A and 32B. The flaps formed between the aperture 26 and the surface 30 are illustrated greatly enlarged in FIG. 7 in which the angle of the slit or opening 32 is more clearly shown. This angle is preferably in the range of from 30° to 60° and most preferably 45°. The slit 32 need not be cut but may also be molded into the belt.

Referring now to FIG. 5, the belt 24 is shown wrapped about a pulley 36 with the lower surface 28 of the belt in contact with the pulley. Therefore, the upper surface 30 of the belt 24 is elongated (being at a larger radius). As a result of this elongation, the slit 32 opens and the ends or walls of the flaps 32A and 32B separate to form a gap at the slit 32. The aperture 26 is thus enlarged to facilitate the insertion or ejection of a cylindrical capacitor blank 38 shown in phantom lines in FIG. 5. If flat capacitors or capacitors of some other shape are used, the aperture 26 is shaped accordingly.

Referring again to FIG. 1 and also to FIG. 2, the path of the belt 24 is shown passing over the pulley 36 in the vicinity of the loading device 20 for loading capacitor blanks in the belt. After the capacitor blanks have been properly loaded in the belt 24, the belt passes over a sensing pulley 40 in such a way that the surface 30 of the belt is in contact with the pulley 40 in the configuration illustrated in FIG. 6. Since the surface 30 is at a lesser radius than that surface 28 of the belt 24, the surface 30 tends to be foreshortened and the web of the belt material in the region of the slits 32 is compressed. At this point, the angle of the slits 32 causes the walls or ends of the flaps 32A and 32B to slide and cam upon one another and overlap, thereby tightly encircling the capacitor rolls positioned in the apertures 26. The overlapping of these walls or ends of the flaps 32A and 32B is more clearly shown in the enlarged illustration of FIG. 8.

The belt 24 is made of silicon rubber (e.g., silastic RTV 3112 manufactured by Dow Corning Corporation, Midland, Mich. 48640) which is known to be highly flexible and very soft as well as to have considerable resistance to temperatures as high as 600° F. The softness of the silicon rubber in the belt 24 causes the web material in the region of the ends or walls of the flaps 32A and 32B to yield and squeeze together (especially the edge of the flap 32A), thereby further filling any crevices between the inner surface of the aperture 26 and the capacitor blank contained therein.

Referring again to FIGS. 1 and 2, as the belt 24 passes around the sensing pulley 40, it passes within a sensing station 42 which contains a source of illumination (not shown) and a photocell 44 that are positioned on either side of the belt 24 and generally in line with the apertures 26. Therefore, as each aperture 26 passes between the light source and the photocell 44, the presence or absence of a capacitor blank within the aperture is noted. If several apertures in a row are found to be empty, the entire solder coating machine is stopped and an alarm is sounded to summon an attending operator. As an example of a rudimentary form of alarm, the appearance of an empty aperture advances a stepping relay (not shown). A filled aperture resets the stepping relay. Three empty apertures in a row cause the relay to initiate the alarm.

As the belt 24 passes away from the sensing pulley 40 it assumes a gentle arc over a lift bar 48 which assures that the surface 30 is slightly shorter than the surface 28. This arc keeps a slight compression within the apertures 26 so that the capacitor blanks won't fall out.

As the belt progresses, it next passes around a spray pulley 50 which also flexes the belt 24 in a direction to foreshorten the surface 30 and thus squeeze and mask the capacitor blanks within the apertures 26. The spray pulley 50, unlike the other pulleys used in this mechanism, does not have a flange for centering the belt 24. Therefore, two centering rollers 52, each having a vertical axis, are positioned on either side of the spray pulley 50 in order to limit the lateral freedom of the belt 24.

Referring now to FIG. 3, the belt 24 is shown passing between the centering rollers 52. The belt is carried on the spray pulley 50 (not visible in FIG. 3) between a pair of solder spray nozzles 54 of conventional design, each projecting a stream of molten solder 56 pumped from a source (not shown) of molten solder at a temperature of approximately 900° F. The solder nozzles 54 direct their respective streams of molten solder 56 at the belt 24 and particularly at the apertures 26 therein. The ends of the capacitors within the apertures 26 are thus coated with solder to facilitate further steps in their manufacturing process. The term "spraying" includes any known means for applying solder to the ends of the capacitors 38.

Since the belt 24 is wrapped tightly about the spray pulley 50 in a direction to foreshorten the surface 30 of the belt 24, the apertures 26 are pressed in as small a diameter as possible and still encircle the capacitor blanks, thereby preventing solder from passing along the sides of the capacitor blank and thus short-circuiting the capacitor from one end to the other. The sides of the belt at each aperture 26 can then be said to be masking all of the surfaces of a capacitor blank, except for its ends. The solder spray nozzles 54 are illustrated in phantom lines in FIG. 2 and in solid lines in FIG. 1.

The solder spraying station is contained in a metal housing 60, the shape of which is best illustrated in FIG. 3. The housing 60 prevents solder from splashing onto the remainder of the conveyor system illustrated in FIGS. 1 and 2 or to other locations where the hot solder might constitute a hazard to the operator. A vent stack 62 is provided to remove fumes which might evolve from an applied flux or overheated insulating material of the capacitor blanks, etc.

When the highly flexible belt straightens out as it leaves the spray pulley 50, any solidified solder that might adhere to it is greatly loosened and tends to fall off. Solder particles that fall off at this point within the housing 60 are recovered, reheated, and recycled through the spray nozzles 54.

As the belt 24 leaves the spray pulley 50, it passes to a discharge pulley 66. The belt 24 passes around the pulley 66 with the surface 28 foreshortened and the surface 30 elongated. This belt curvature causes each slit 32 to gap and enlarge the aperture 26. Air at a positive gage pressure is supplied through a hose 68 to an eject nozzle 70 which blows the capacitor blanks out of the apertures 26 into a suitable receiver (not shown).

The ejecting air also tends to remove from the belt even the most tenacious particles of solidified solder. The solder particles that fall off at this point must be swept up periodically for reclamation.

The now empty belt 24 then passes over an idler pulley 72 and then over an adjustable pulley 74. The adjustable pulley 74 is mounted on an axle 76 that is free to translate in a slot 78. The axle 76 is carried on a shaft 80 which is connected to a piston within an air cylinder 82. When the solder spraying machine is turned on, air under a suitable pressure is supplied to the cylinder 82 in order to move the axle 76 to the left as shown in FIG. 2. This puts the belt 24 under the proper amount of tension for operation. When the solder spraying machine is turned off, the air is released within the cylinder 82 and the belt 24 is allowed to become slightly slack so as not to remain on tension over an extended period of time that it sits idle in one position.

As the belt 24 leaves the adjustable pulley 74, it passes again over the loading pulley 36 to start a new cycle operation.

Although a particular embodiment of the invention is shown in the drawings and has been described in the foregoing specification, it is to be understood that other modifications of this invention, varied to fit particular operating conditions will be apparent to those skilled in the art; and the invention is not to be considered limited to the embodiment chosen for purposes of disclosure, and covers all changes and modifications which do not constitute departures from the true scope of the invention.

What is claimed is:

1. A method of solder coating the ends of roll capacitor blanks carried in a flexible belt having longitudinally spaced apertures extending transversely therethrough and slits extending angularly from the apertures to one flat surface of the belt to form pairs of flexible flaps enclosing the apertures comprising:

loading roll capacitor blanks into the apertures in the belt;

flexing the belt in a direction toward the slitted flat surface to move the angular slitted surfaces of the flaps over each other to constrict the apertures and form virtually continuous surfaces about the peripheries of the capacitor blanks;

advancing the belt to move the capacitor blanks to a work station;

spraying solder at the belt and roll capacitor blanks within the work station;

flexing the belt in a direction away from the slitted flat surface to slide and cam the angular slitted surfaces of the flaps over each other and enlarge the apertures; and ejecting the solder-end-coated capacitor blanks from the enlarged apertures in the belt.

2. A method according to claim 1 wherein the ejecting step is accomplished at least in part by blowing a jet of fluid at the roll capacitor blanks in the enlarged apertures in the belt.

3. A method according to claim 1 wherein the step of flexing the belt to constrict includes:

squeezing the roll capacitor blanks; and conforming the belt to the surface of the roll capacitor blank sufficiently to preclude the passage of molten solder along the side of the roll capacitor blank in the belt carrier.

4. A method of applying a solder spray to the ends of roll capacitors by manipulating a continuous belt having a plurality of transversely extending open-ended slots, said belt having pairs of oppositely disposed sections projecting over the slots with each section having a bevel tip overlying the bevel tip on the other section of each pair, which comprises:

moving the belt through a roll capacitor loading station and through a solder spray station;

arcuately engaging the unslotted side of the moving belt while passing through the loading station to bend the belt to compress the underside of the belt while flexing the slotted side to spread the projecting sections overlying each slot to open the slots;

loading roll capacitors seriatim into each open slot, said flexible belt completely encircling saids capacitors;

arcuately engaging the slotted side of the moving belt while passing through the solder spray station to compress the slotted side to move the bevel tips over each other to compress the walls of the slots against the roll capacitors and mask the circumferential surfaces thereof; and spraying solder axially to coat the ends of the compressed roll capacitors.

* * * * *